United States Patent
Van Hout et al.

(10) Patent No.: US 6,230,834 B1
(45) Date of Patent: May 15, 2001

(54) BATTERY MOUNTING SYSTEM

(75) Inventors: James E. Van Hout, Auburn Hills, MI (US); Gregory Denomy, Markham (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/397,978

(22) Filed: Sep. 16, 1999

(51) Int. Cl.[7] .................................................. B60R 16/04
(52) U.S. Cl. ..................... 180/68.5; 224/902; 429/100
(58) Field of Search ...................... 180/68.5; 224/527, 224/902; 248/503; 429/100, 163, 175

(56) References Cited

U.S. PATENT DOCUMENTS

| | | | |
|---|---|---|---|
| 2,947,373 | * 8/1960 | Wilson | 180/68.5 |
| 3,053,336 | * 9/1962 | Zednik, Jr. | 180/68.5 |
| 3,199,624 | * 8/1965 | Burns et al. | 180/68.5 |
| 4,169,191 | * 9/1979 | Alt et al. | 429/99 |
| 4,508,794 | * 4/1985 | Wright | 429/100 |
| 4,754,827 | * 7/1988 | Hirabayashi | 180/68.5 |
| 5,086,860 | * 2/1992 | Francis et al. | 180/68.5 |
| 5,167,395 | * 12/1992 | Pearman et al. | 248/551 |
| 5,377,947 | * 1/1995 | Johnson | 248/503 |
| 5,484,667 | * 1/1996 | Sahli et al. | 429/100 |
| 5,547,036 | 8/1996 | Gawaskar et al. | 180/68.5 |
| 5,636,701 | 6/1997 | Norman et al. | 180/68.5 |
| 5,681,668 | * 10/1997 | Reed et al. | 429/100 |

* cited by examiner

Primary Examiner—J. J. Swann
Assistant Examiner—J. Allen Shriver
(74) Attorney, Agent, or Firm—Kenneth H. MacLean

(57) ABSTRACT

A battery mounting system is provided which permits use of batteries designed both in accord with European and American battery casing standards. The mounting system utilizes a strap member with a first portion partially bordering a first side of the battery, a second mid-portion extending underneath the battery, a third portion partially bordering a second side of the battery, and a fourth portion providing a support surface which extends lateral away from the battery's second side. The first portion has an end compliantly contacting a first angled surface formed on one side of the battery. The fourth portion supports a movable retainer which has an angled ramp complementary to a similar ramp formed on the fourth portion for engagement together so as to laterally urge the retainer into engagement with a second angled surface on the second side of the battery. A fastener selectively urges the retainer against the fourth portion to thus engage the ramps for moving the retainer laterally into engagement with the battery casing.

3 Claims, 4 Drawing Sheets

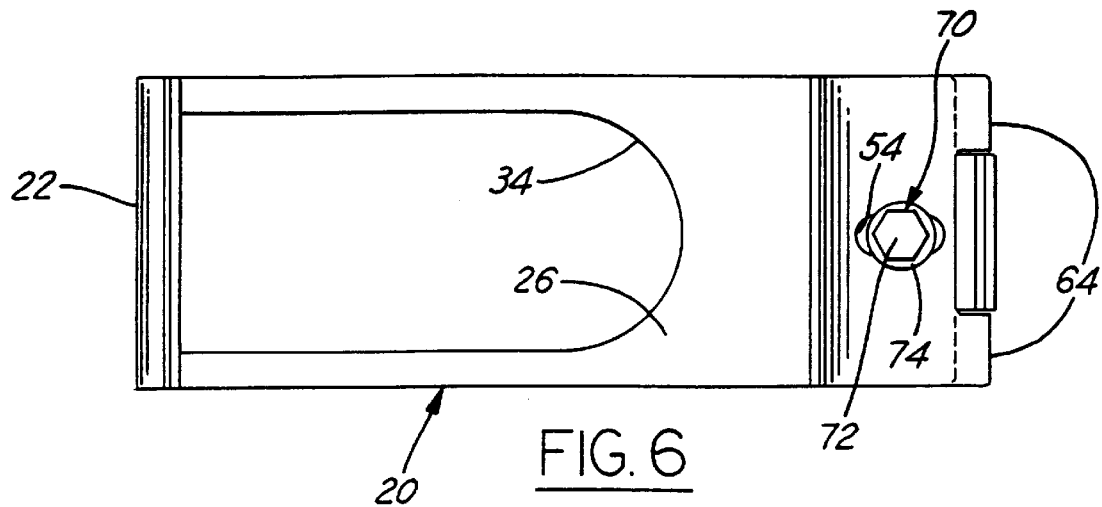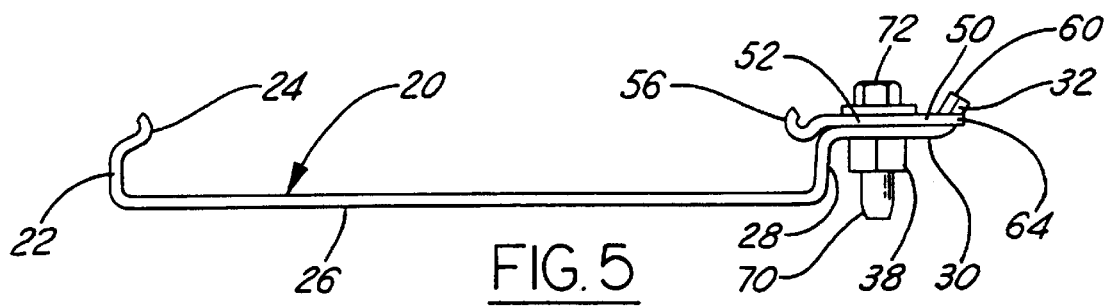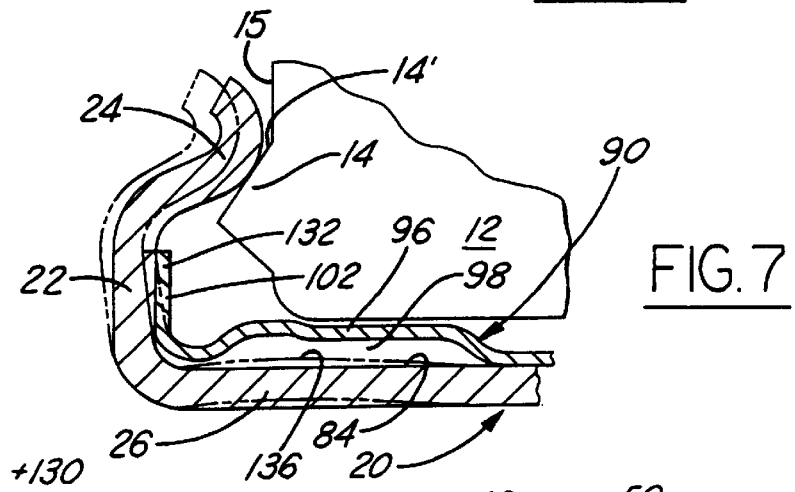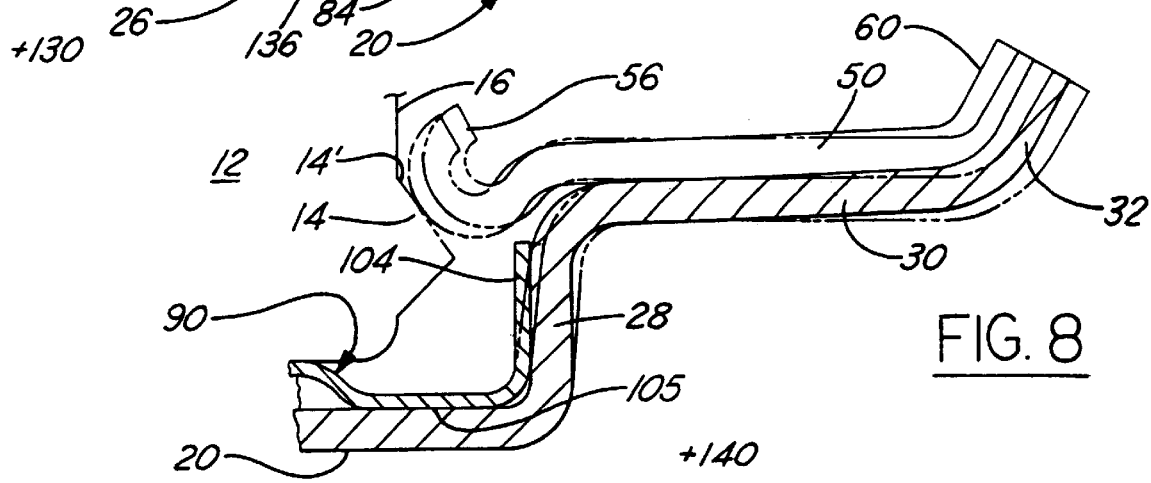

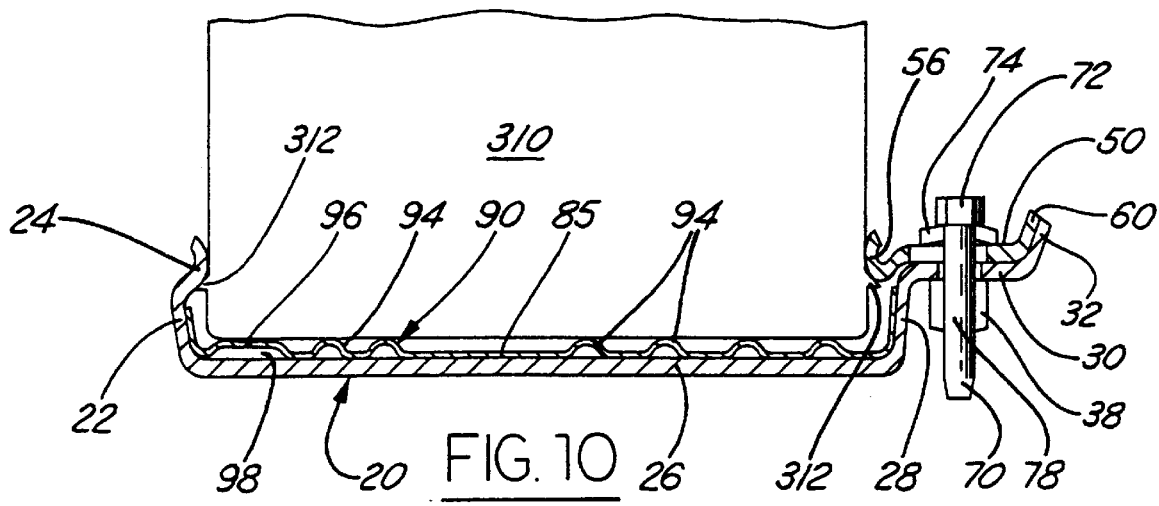
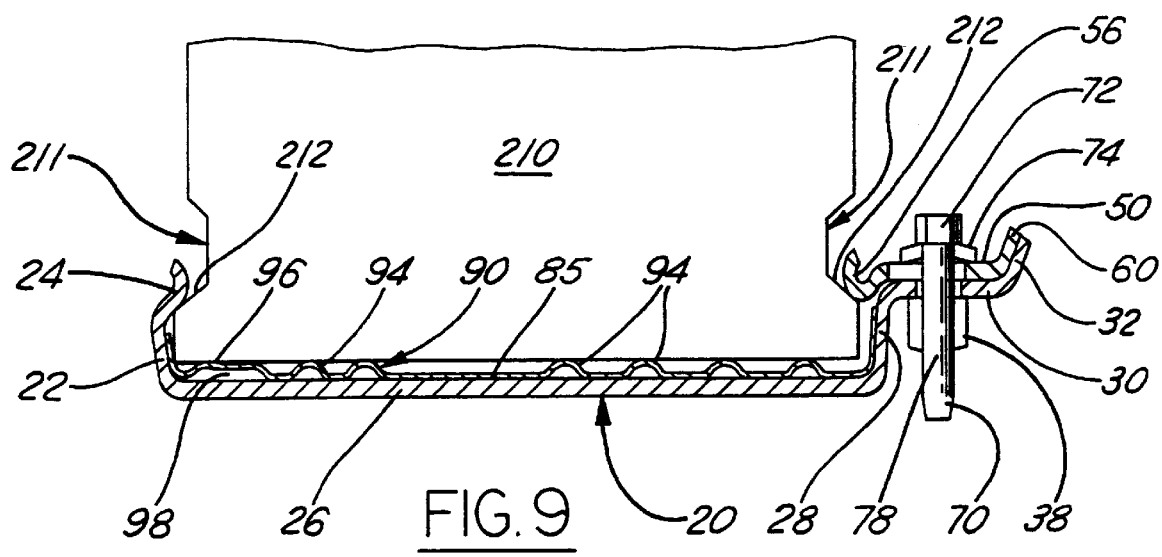

BATTERY MOUNTING SYSTEM

FIELD OF THE PRESENT INVENTION

The present invention concerns a versatile mounting system for an automotive vehicle battery.

PRIOR DEVELOPMENTS

An automotive vehicle battery must be securely attached within and to a vehicle to prevent damage to it from vibrations. Previously, one or two rods or arms were extended from a battery tray which was mounted to the vehicle. The arms were attached to a structure passing over or around the upper edge of the battery which secured the battery to the tray. However, in the effort to make battery casings smaller and to occupy less space in the engine compartment, and also to prevent problems from the clamp contacting a battery terminal, a newer clamping design style has evolved. The newer style is to have an angled ledge-like configuration formed on a lower surface on the battery casing which is engaged by a clamp which bears against the ledge-like configuration to secure the battery to the tray.

In the U.S. and Europe, two similar, but dimensionally different standards have evolved with respect to the above described battery ledge-like configurations. The Comit'e European de Normalisation Electrotechnique (CENELEC) governs the European mounting standards while the Battery Council International (BCI) governs North American mounting standards. However, the mounting provisions for both standards include a protruding angled ledge along the lower side of the battery. Although similar, the length, width, depth and location of these angled ledges are different for each of the standards. In most cases, the dimensional differences are only a few millimeters, however, the small differences are enough to produce undesirable clamping forces when an alternative battery is installed.

Vehicles built in the U.S. and shipped to Europe for sale are typically built with standard U.S. batteries compliant to BCI standards. During the vehicle life in Europe it will most likely become necessary to replace the battery, normally with a European mounting system as a standard U.S. battery may be difficult and expensive to obtain. Previously, standard clamping methods did not accommodate readily available European batteries for replacement in U.S. built vehicles. Similarly the same is true for a vehicle built in Europe and sold in North America. It is desirable to provide a battery mounting system which can accommodate either a European or North American style battery.

SUMMARY OF THE INVENTION

The present invention provides a battery mounting system which can securely mount batteries built according to European or to North American battery mounting standards. The drawings illustrate a battery mounting system which is a preferred embodiment and includes a strap member which extends underneath the battery. The strap member has a hooked first end which contacts a first side of the battery and compliantly engages the battery casing. A retainer member is attached to the strap on an opposite second side of the battery casing. One end of the retainer member has a hook-like configuration which compliantly engages and urges the battery toward the opposite end of the strap member. To support the retainer member, the strap has a lateral surface and a ramped end portion which cammingly engages the retainer and urges it toward the second side of the battery. A fastener secures the retainer member to the strap. This battery mounting system according to the present invention accommodates batteries built to both European and North American standards. Additionally the mounting system of the present invention accommodates batteries of the same standards which differ slightly from manufacturer to manufacturer.

It is an object of the present invention to provide a versatile battery mounting system which can accommodate a battery built to either North American or European standards.

The above-noted object of the present inventive battery mounting system will become more apparent to those skilled in the art as the invention is further explained in the accompanying drawings and detailed description.

BRIEF DESCRIPTION OF THE DRAWINGS

FIG. 5 is a side elevational view of the strap member of the present invention along with the retainer and the associated fastener.

FIG. 6 is a top plan view of the strap and retainer shown in FIG. 5.

FIG. 7 is an enlarged sectional view illustrating the flexure of one end portion of the strap member and an associated battery tray when the mounting system of the present invention is utilized with a North American style battery casing.

FIG. 8 is a view similar to that of FIG. 7 showing the flexure of the second opposite end portion of the strap member and the retainer member when the mounting system of the present invention is utilized with a North American style battery casing.

FIG. 9 is a view similar to that of FIGS. 2 and 9 which illustrates the utilization of the battery mounting system according to the present invention with a battery casing built according to European mounting standards.

FIG. 10 is a view similar to that of FIG. 2 illustrating the utilization of the mounting system according to the present invention with a North American style battery having angled ledges differing slightly from those of other North American type battery casings.

DETAILED DESCRIPTION OF THE DRAWINGS

Figure 1:
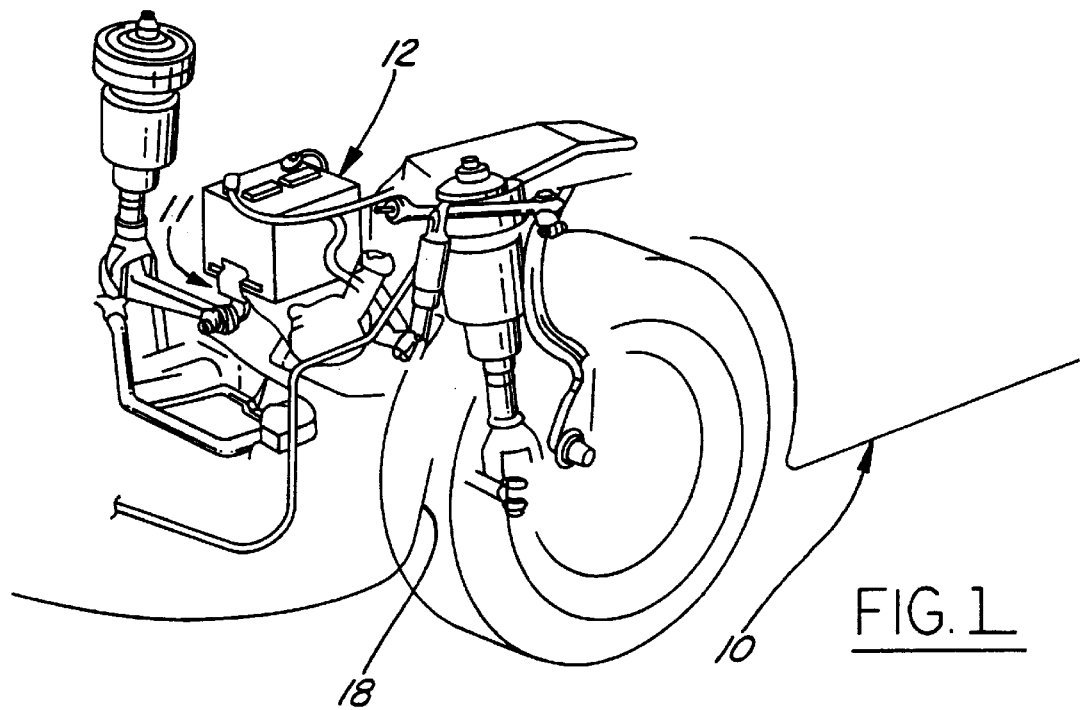
FIG. 1 is a perspective view of a battery mounting system according to the present invention with the battery being shown in the environment of an automotive vehicle with portions of the automotive vehicle being removed for clarity of illustration.

In an automotive vehicle 10, FIG. 1 illustrates a battery mounting system 11 according to the present invention. Particularly, the mounting system is shown in the vehicle's engine compartment or the underhood region of the vehicle. A battery 12 associated with the mounting system 11 is shown in more detail in FIGS. 2–8. Battery 12 has a casing or housing designed according to the North American standard (BCI). This North American standard casing includes a protruding ridge 14 extending out from both the battery's first side 15 and second side 16. The battery mounting system 11 and battery 12 may be located forward of the front wheel well 18 and laterally of a generally centered radiator (not shown).

Figure 2:
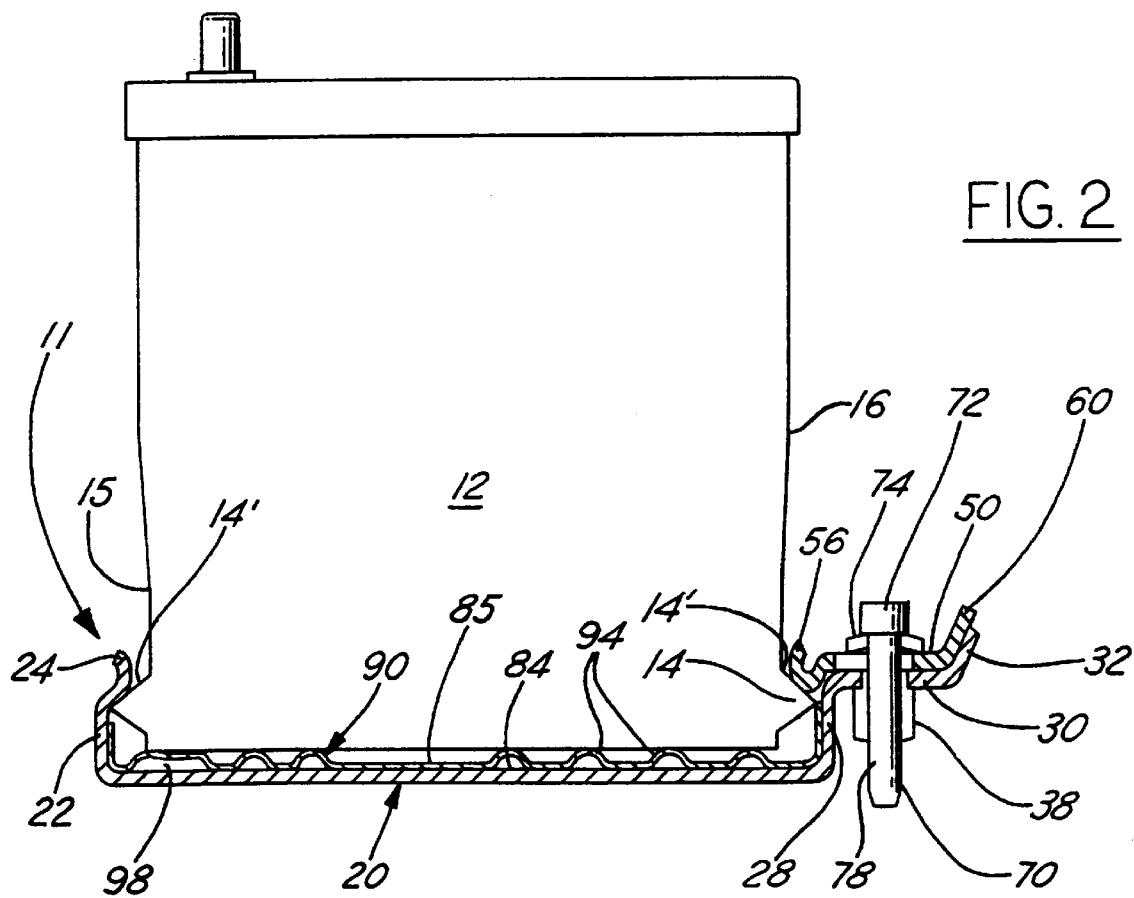
FIG. 2 is a side sectional view of the battery mounting system shown in FIG. 1.
Figure 3:
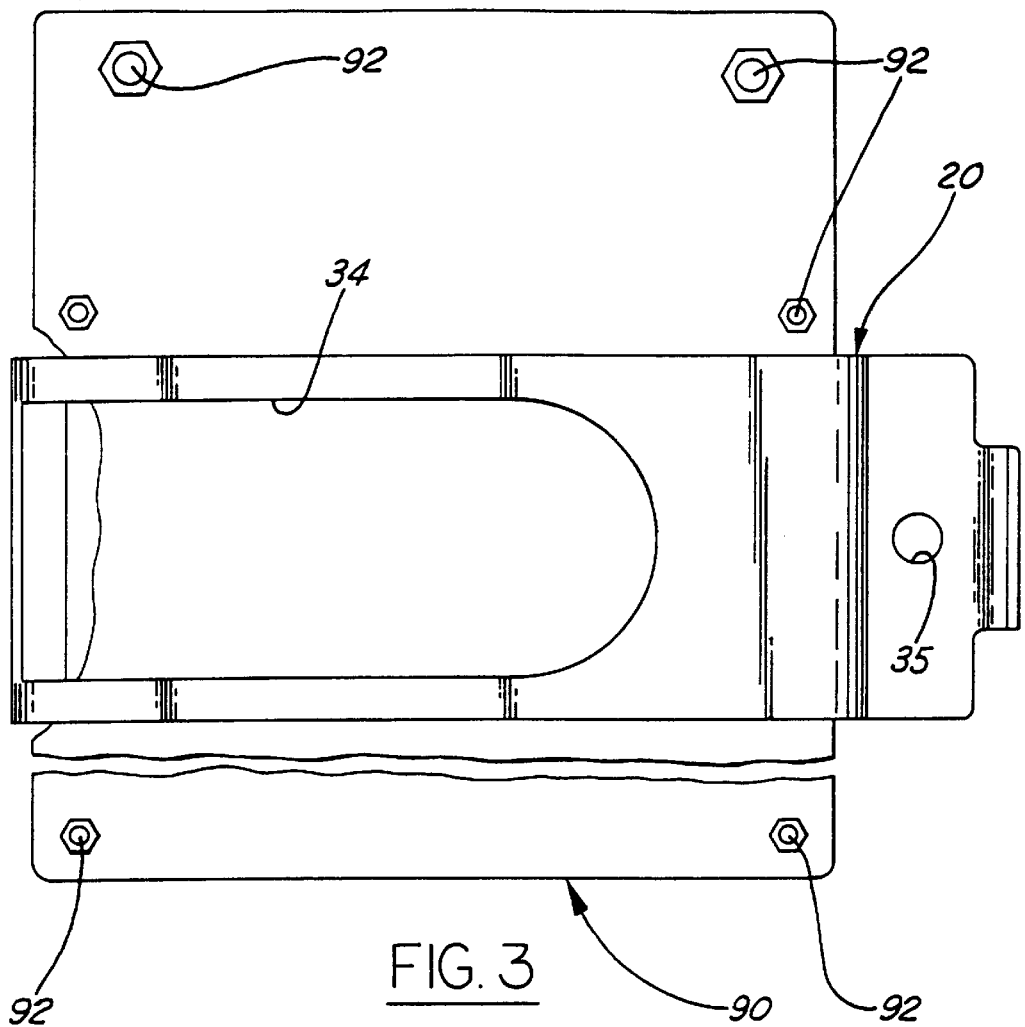
FIG. 3 is a bottom view of the battery mounting system shown in FIGS. 1 and 2.

Referring to FIGS. 2–6, the mounting system 11 has a strap member 20 extending underneath battery 12 The strap member 20 is typically a stamped steel piece of 2–4 mm thickness. The strap 20 has a first end portion 22 which extends adjacent the first side 15 of the battery and with a hook-like configuration 24 which compliantly engages the angled surface 14' extending along the first side 15 of the battery 12. A mid-portion 26 of the strap member 20 located beneath the battery 12 is integrally connected to the strap's first end portion 22 and to the strap's second end portion 28. The second end portion 28 extends adjacent to the battery's second side 16 in a manner similar to relationship between the other side 15 and the strap's first end portion 22. An extended portion 30 of the second end portion 28 provides a substantially horizontal surface projecting outwardly from the second side 16 of the battery 10. The extended portion 30 has an aperture 35 therethrough to receive a bolt as best shown in FIG. 3. The extreme outward end of portion 30 is configured with an upwardly turned end defining a ramp portion 32. An internally threaded nut member 38 is fixable connected to the underside of the strap portion 30. Typically, the strap member will be approximately two to four inches wide and have a cutout portion 34 adjacent its first end portion 22 and along its mid-portion whose purpose will be described hereinafter.

A retainer member 50 is associated with the second end portion 30 and is mounted upon extended portion 30. Retainer 50 has a generally flat mid-portion 52 which is positioned in overlying relation to the extended portion 30 of the strap member 20. An elongated aperture 54 is formed through the retainer 50 as best shown in FIG. 6. Aperture 54 is aligned with the aperture 35 in the portion 30 of strap member 20. The elongation of the aperture 54 allows the retainer 50 to move towards and away from the second side 16 of the battery 10 as may be necessary for establishing desirable clamping when the battery is installed. This also provides clearance during servicing when the battery is removed and replaced. One end portion of the retainer 50 has a compliant hook-like configuration 56 for engagement with the battery's angled surface 14' of ledge 14. The hook-like configuration 56 compliantly urges the battery 12 leftward in FIG. 2 toward the strap's opposite end portion 22. The retainer defines a ramp-like end configuration 60 like the ramp-like configuration 32 of the strap 20. Together, the ramp-like configurations 32, 60 act to urge the battery 12 leftward. For the purpose of maintaining a center position of retainer 50 on extended portion 30, lateral wings 64 are formed which extend to either side of the centrally located ramp portions 32 and 60 as best shown in FIGS. 5 and 6.

A threaded fastener, preferably in the form of bolt 70, attaches the retainer 50 to the extended portion 30 of strap member 20. The bolt 70 has a head portion 72 which abuts a spring washer 74. A threaded shank 78 of the bolt 70 extends through apertures 54 and 35 and is threadably engaged with the nut 38 attached to the underside of strap portion 30. As the bolt 70 is tightened, the cam portion 60 of retainer 50 causes the retainer to move leftward in FIG. 2.

Figure 4:
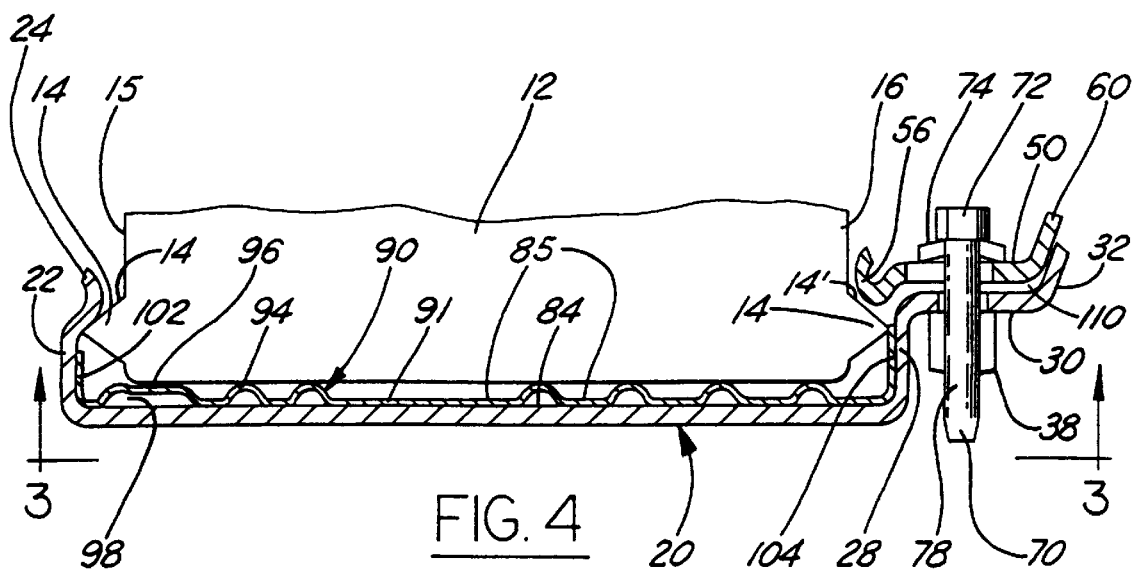
FIG. 4 is an enlarged side sectional view of the battery mounting system shown in FIG. 1 before a fastener has been torqued to move the retainer of the present invention to its installed position.

As best shown in FIGS. 3 and 4, the strap's mid-portion 26 has an upper surface 84 positioned across and beneath a battery tray member 90. A portion 91 of the tray 90 extends under virtually the full length of the battery and is fixably connected to the vehicle by virtue of threaded fasteners 92. This tray portion 91 is formed with a series of ridges 94 to either side of a flat portion which stiffen the structure for supporting the weight of the battery 12. The portion 91 is attached, preferably by spot welds at 85 between right and left series of ridges to the strap's mid-portion 26. Further, the tray member 90 is formed with a raised portion 96 along one edge which has a substantial width and provides an undercut or cavity 98 best seen in FIGS. 4 and 7.

As best shown in FIGS. 7 and 8, the battery tray 90 has first and second lateral side edge portions 102 and 104 which are turned substantially normal to the plane of the tray's mid-portion. The side edge 102 is integrally connected to the raised portion 96 as shown in FIG. 7 and is preferably attached to the strap's first side portion 22 by spot welds. The raised portion 96 of the tray 90 adjacent the side edge portion 102 does not contact the surface 84 of the strap member 20. Likewise in FIG. 8, the opposite side edge 104 of the tray 90 is spot welded at its upper end to the strap's side portion 28. The region 105 between the battery tray 90 and the overlying portion of tray 90 is not connected by a weld or otherwise.

Referring back to FIG. 4, as the battery 12 is first positioned upon the mounting tray 90, a gap 110 between retainer 50 and the strap's horizontal extended portion 30 is formed. The gap 110 is intended permit urging the battery leftward to create an interference condition between the battery's angled ridge or ledge 14 at battery side 15 and the clamping surface provided by the hook portion 24. This also creates the desired placement of the battery relative to the hook-like configuration 56 of retainer 50. To secure the battery, the bolt 70 is tightened so that the hook-like configuration 56 seats against ridge or ledge 14 on side 16 of battery 12. As the bolt 70 is further tightened, the retainer's end ramp structure 60 contacts the ramp structure 32 of strap portion 30 which cams the retainer 50 leftward toward the side 16 of the battery 12 as shown in FIG. 2. This creates a firm engagement between the hook-like configurations 24 and 56 and the respective battery ridges or ledges 14.

An important design consideration of the subject battery clamping system is to create a design wherein upon the tightening of fastener or bolt 70 the hook-like configurations 24 and 56 deflect equally at both sides of the battery 12, thus creating equal clamping on both opposite sides of the battery. Equal clamping forces require essentially equal spring rates of the system and generally similar deflection paths of both ends of strap 20. It is desirable to create equal spring rates and deflection paths to ensure that the battery 12 does not disengage due to a weaker clamping on one side of the battery than the other. Therefore, both hook-like configurations 24 and 56 should contact only angled surfaces 14' of the ridges or ledges 14. Otherwise, one of the hook-like configurations 24 or 56 might possibly move off an angled surface 14' and ride up the side of the battery case. Such a contact condition might lead to vibrational related wear of the battery case. The aforementioned central cutout 34 of material formed in the strap 20 contributes greatly to achieving a generally matched spring rate on both sides 15 and 16 of the battery. The cutout 34 is defined between the strap's first and second portions 22 and 28. The width of cutout 34 can be selected to match the corresponding desired strength of the side of the battery mounting system which incorporates the retainer 50.

The connections of the strap's end portions 22, 28 to the tray's side edges 102, 104 contributes to achieving geometrically similar deflections of both hook-like configurations 24 and 56 against the surfaces 14'. Referring to FIG. 7, the hooklike configuration 24 is pivotal about a point 130. The amount of deflection is a result of the movement of the tray's attachment point 132 with respect to the distortion of the strap's end portion 22 and of the upward deflection of the strap 20 in region 136. The upward deflection of portion 26 in region 136 by the undercut 98 as provided by the raised portion 96 of tray 90 as best shown in FIG. 4. FIG. 8 illustrates how the natural bending of the retainer 50 and the strap's side 28, extended end portion 30 each deflect in a pivotal motion about point 140. Points 130 and 140 are designed to be similar in spacing from the connection between configurations 24, 56 and respective surfaces 14'. This will result in both retainer hook-like configurations 24, 56 following a similar geometric path of deflection.

In FIG. 9, the subject battery mounting and clamping system is illustrated in an application for mounting a battery 210 which is built according to the European mounting system. Battery 210 has an inwardly extending groove 211 formed along both sides of the battery. This produces an angled surface 212 on each side of the battery analogous to the surfaces 14' described above in relation to an American manufactured battery. FIG. 10 illustrates the same embodiment of the present battery mounting system utilized to mount a battery 310 built according to a slightly different North American standard wherein the angled ridge 312 is provided by a configuration of a ninety degree triangle rather than an equilateral triangle as shown in FIGS. 2 and 4. FIG. 10 fully illustrates that the present invention can be utilized in situations wherein the ledges or ridges may vary from manufacturer to manufacturer.

While preferred embodiments of the present invention have been disclosed, it is to be understood that it has been described by way of example only and that various modifications can be made without departing from the spirit and scope of the invention as it is encompassed by the following claims.

What is claimed is:

1. A battery mounting system for mounting a battery in a vehicle, the battery having opposing first and second sides with angled ledges extending thereon, said mounting system comprising:

a battery tray fixably connected with said vehicle, said battery tray having a first portion for extension beneath said battery and said battery tray having first and second lateral side edge portions connected with said first portion, said first and second lateral side edge portions being adjacent to the first and second sides of the battery and the battery tray having a ridged undercut area adjacent to said first lateral side edge portion;

a strap having a first portion partially bordering a first side of the battery and connected with said battery tray's first lateral side edge portion, said strap having a second portion extending underneath said battery beneath said battery tray and being connected therewith, said strap having a third portion bordering the second side of the battery and connected with said tray's second lateral side edge portion, and said strap having a fourth portion providing a laterally and outwardly extending surface with respect to the battery and carrying a ramp along its end, said first portion of said strap having a hook-like configuration compliantly contacting an angled ledge on the first side of the battery whereby the battery is urged toward said strap's third portion;

a retainer with a first portion positioned over said strap's fourth portion, said retainer having a hook-like end configuration for compliantly contacting said angle ledge on the second side of the battery to urge said battery toward said strap's first portion and said retainer having a ramped surface along an opposite end from said hook-like configuration a produce a camming engagement with said ramp of said strap's fourth portion thereby to urge said retainer laterally toward the second side of the battery and toward said strap's hook-like configuration with a force generally equal to the force exerted by of said hook-like configuration on said strap's first portion; and a threaded fastener extending through said retainer and said strap's fourth portion into a threaded nut for connecting said retainer with said strap and selectively drawing said retainer toward said strap's fourth portion into an assembled position.

2. A battery mounting system for mounting a battery in a vehicle, said battery having opposing first and second sides, each with angled ledges, said battery mounting system comprising:

a strap having a first portion partially bordering said first side of the battery, said strap having a second portion extending underneath the battery, said strap having a third portion partially bordering the second side of the battery, and said strap having a fourth portion providing a surface extending outwardly from said third portion and the battery, and said first portion of said strap having a hook-like configuration compliantly contacting said angled ledge on the first side of the battery whereby the battery is urged toward said third portion of said strap, said strap formed with a cutout portion for decreasing the compliant force exerted by said second portion of said strap upon remainder of said strap;

a retainer having a mid-portion positioned over said fourth portion of said strap, said retainer having an end portion for contacting said angled ledge on the second side of said battery whereby the battery is urged towards said first portion of said strap;

said first portion of said strap and said end portion of said retainer compliantly engage the respective angled ledges of the battery with generally equal forces; and a fastener connecting said retainer to said fourth portion of said strap.

3. A battery mounting system for mounting a battery in a vehicle, said battery having opposing first and second sides, each with angled ledges, said battery mounting system comprising:

a battery tray fixedly connected to the vehicle and adapted to extend directly underneath the battery;

a strap having a first portion partially bordering said first side of the battery, said strap having a second portion extending underneath the battery and battery tray, said strap having a third portion partially bordering the second side of the battery, and said strap having a fourth portion providing a surface extending outwardly from said third portion and the battery, and said first portion of said strap having a hook-like configuration compliantly contacting said angled ledge on the first side of the battery whereby the battery is urged toward said third portion of said strap;

said strap being connected to the battery tray and wherein said battery tray is configured with ridges extending from one end to an opposite end and wherein said battery tray has an undercut formed to allow clearance for an adjacent portion of said strap's second portion to flex underneath the battery and to permit flexure of said first portion of said strap when compliantly contacting said angled ledge on the first side of the battery;

a retainer having a mid-portion positioned over said fourth portion of said strap, said retainer having an end portion for contacting said angled ledge on the second side of said battery whereby the battery is urged towards said first portion of said strap; and a fastener connecting said retainer to said fourth portion of said strap.

* * * * *